May 16, 1967 — O. M. ULBING — 3,319,494
DUAL-SPEED FASTENER DRIVING TOOL
Filed Oct. 22, 1964 — 2 Sheets-Sheet 1

INVENTOR.
OTMAR M. ULBING
BY
David W. Tibbott
ATTORNEY

May 16, 1967     O. M. ULBING     3,319,494
DUAL-SPEED FASTENER DRIVING TOOL
Filed Oct. 22, 1964     2 Sheets-Sheet 2

INVENTOR.
OTMAR M. ULBING
BY
David W. Tibbott
ATTORNEY

United States Patent Office 3,319,494
Patented May 16, 1967

3,319,494
DUAL-SPEED FASTENER DRIVING TOOL
Otmar M. Ulbing, Lisle, N.Y., assignor to Ingersoll-Rand Company, New York, N.Y., a corporation of New Jersey
Filed Oct. 22, 1964, Ser. No. 405,782
4 Claims. (Cl. 74—812)

This invention relates to fastener driving power tools and more particularly to multi-speed power tools, such as nut runners.

It is desirable for power tools, such as nut runners, to provide for dual speeds so that a fastener can be run down at high speed, when the required torque load is low, and then tightened with a higher torque output from the tool which necessitates a reduced speed. Heretofore, this dual-speed operation has been provided by complex and expensive clutching and/or speed shifting means. In addition to the complexity and cost of present speed changing means in power tools, such means adds substantial bulk and size to power tools.

Accordingly, it is an object of the present invention to provide a compact, relatively inexpensive and simple power tool capable of dual-speed operation.

Another object of this invention is to provide a speed changing device for a fastener driving tool which is substantially free of undesirable inertia effects at high speed. Spurious torques created by inertia are undesirable because they are inconsistent and unreliable for tightening fasteners to uniform torque loads.

Another object of the invention is to provide a speed changing means for a tool which is shifted between speeds merely by reversing the direction of rotation of the input drive shaft.

It is contemplated by the present invention to provide a power tool, such as a nut runner, which comprises an input drive means and an output drive means interconnected by a clutch means which is operative in one direction of rotation of the input drive means to lock the input drive and output drive means together and to drive the output drive means at the same speed until a predetermined torque is reached. After the predetermined torque is reached, the clutch means slips and thereby prevents the input drive means from applying a higher torque to the output drive means. The input drive means and output drive means are further interconnected by a gear train which is operative in the reverse direction of rotation of the input drive means to drive the output drive means at a slower speed and at a higher torque while the clutch means slips. The clutch means is located so that the gear train and input drive means are incapable of applying inertia torque loads to the output drive means when the input drive means is running at high speed and driving the output drive means through the clutch means at the same speed.

The invention will be more fully understood from the following detailed description thereof when considered in connection with the accompanying drawings wherein.

Figures 1, 2, 3:
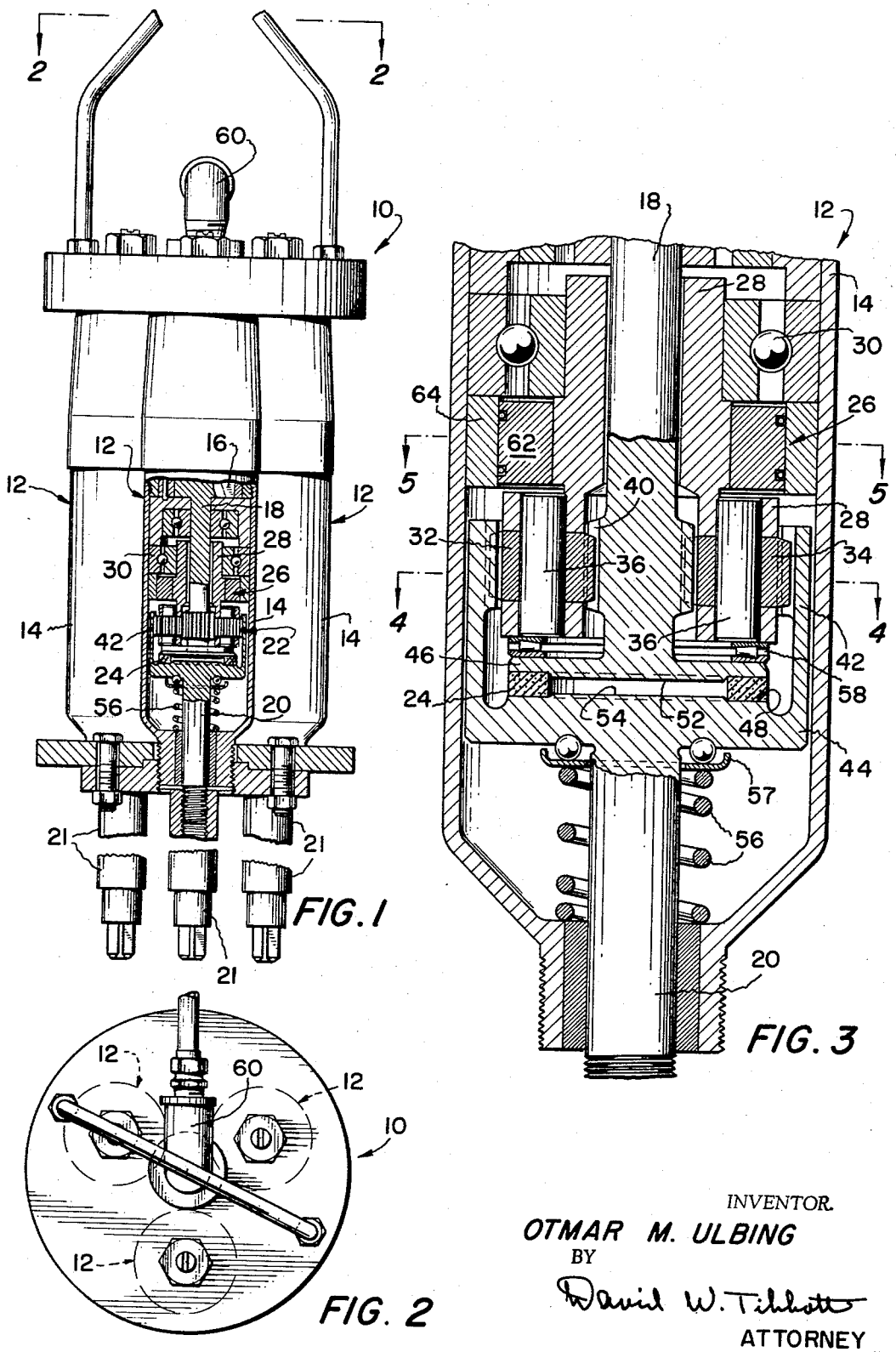
FIG. 1 is an elevational view in partial section of a multiple nut runner having three power tools according to this invention associated together to simultaneously turn three fasteners.
FIG. 2 is a top, plan view of the apparatus shown in FIG. 1.
FIG. 3 is an enlarged, fragmentary, axial cross section of one of the power tools shown in FIG. 1.
Figure 4:
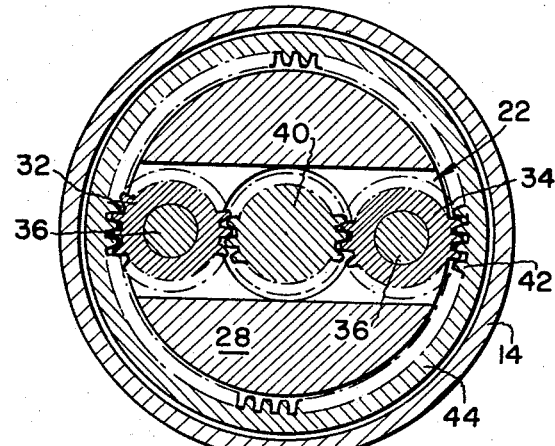
Figure 5:
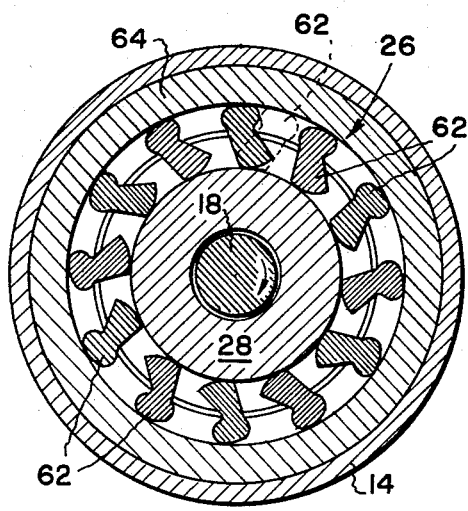

FIGS. 4 and 5 are transverse cross-sectional views taken on lines 4—4 and 5—5 of FIG. 3.

A multiple nut runner 10 is shown in FIGS. 1 and 2 having a plurality of power tools or nut runners 12 according to this invention mounted as a unit for simultaneously driving a plurality of fasteners, such as nuts. The showing of the nut runners 12 as part of an assembly-line apparatus is solely for illustrative purposes and forms no part of the invention.

Each of the nut runners 12 comprises a tubular casing or housing 14 containing a motor 16, such as an air motor, having a rotor or drive shaft 18. A driven output shaft 20 is journalled in the forward end of housing 14 coaxially with the motor drive shaft 18. The drive shaft 18 and driven output shaft 20 are connected together through a planetary gear train 22, a friction clutch 24 and an overrunning brake 26, such as a sprag brake. The output shaft 20 is shown connected to a nut driving spindle 21 in FIG. 1.

As best shown in FIG. 3, the planetary gear train 22 comprises a planet gear frame 28 mounted coaxially around the drive shaft 18 and supported by a bearing 30 for rotation in the housing 14. A pair of planet gears 32 and 34 are rotatably mounted on axle pins 36 carried by the gear frame 28. The planet gears 32 and 34 mesh with a sun gear 40 integrally formed on the drive shaft 18. The planet gears 32 and 34 also mesh with an internal ring gear 42 which is integrally mounted on the driven output shaft 20. The integral ring gear 42 forms a cup-shaped end portion 44 on the output shaft 20.

The friction clutch 24 is interposed between the disc-shaped end portion 46 of the drive shaft 18 and the inner face 48 of the cup-shaped end 44 of the driven shaft 20. The friction clutch 24 is ring shaped and laterally positioned by bosses 52 and 54 on the drive shaft 18 and the driven shaft 20, respectively.

A spring 56 is disposed around the driven output shaft 20 with one end abutting the housing 14 and the opposite end abutting a bearing 57 seated against the cup-shaped portion 44 of the driven shaft 20 to bias the shaft 20 toward the drive shaft 18 and against the friction clutch 24. The force or thrust of the spring 56 is absorbed by a thrust bearing 58 located between the disc-shaped end portion 46 of the drive shaft 18 and the planet gear frame 28. The spring 56 is selected so that the friction clutch 24 will slip at a predetermined torque which is lower than the motor-stall torque of the motor 16.

The overrunning clutch 26 may be of the sprag type, shown in FIG. 5, comprising a plurality of wedges or sprags 62 circumferentially arranged in an annular space between the planet gear frame 28 and a ring 64 press fitted in the housing 14. The overrunning brake 26 permits rotation of the planet gear frame 28 relative to the housing 14 in a clockwise direction, as shown in FIG. 5. When the gear frame 28 is rotated in a counter-clockwise direction, the sprags or wedges 62 are forced to pivot into a binding position between the ring 64 and gear frame 28 so that the gear frame 28 is locked against rotation.

In operation of the foregoing apparatus, assuming a clockwise rotation of the motor drive shaft 18, as seen in FIG. 5, the overrunning brake 26 is in an overrunning position so that the gear frame 28 is free to rotate in a clockwise direction. Under this condition of operation, the driven shaft 20 is driven directly by the drive shaft 18 through the friction clutch 24 at a 1:1 gear ratio. The planet gear frame 28, the planet gears 32 and 34, and the ring gear 42 rotate in unison with the motor drive shaft 18. The foregoing operation is used to run down a nut at high speed, until the torque load on the driven shaft 20 becomes high enough for the clutch 24 to slip. The clutch 24 prevents the application of high torque loads to a nut caused by the inertia of the tool motor and the drive train during deceleration of the tool at the end of running down a fastener.

After the fastener or nut is run down and the friction clutch 24 slips, the operator reverses the direction of rotation of the motor 16 and its drive shaft 18 to a counterclockwise direction, as shown in FIG. 5. This causes the drive shaft 18 to attempt to drive the output shaft 20 and the ring gear 42 in a counterclockwise direction through the friction clutch 24. However, the planet gear frame 28 is locked against rotation in a counterclockwise direction by the wedges of the overrunning brake 26 being forced into a jamming position, as shown in broken lines in FIG. 5. With the gear frame 28 locked against rotation, the sun gear on the drive shaft 18 drives the ring gear 42 through the planet gears 32 and 34. Looking at FIG. 4, the counterclockwise rotation of the sun gear 40 drives the ring gear 42 in a clockwise direction at a reduced speed. The ring gear 42 and driven shaft 20 are still driven in the same clockwise direction of rotation as during the run down phase of the tool operation.

During the later nut-tightening step of the tool operation, the friction clutch 24 is forced to slip since the drive shaft 18 and the output shaft 20 rotate in opposite directions. The wear of the friction clutch 24 is not anticipated to be great since the slippage per nut-tightening operation will not exceed five or six revolutions.

It is now believed readily apparent that the present invention provides a novel power tool in which dual speed of the driven or output shaft is achieved by a compact, simple, and relatively inexpensive mechanism.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

Having described my invention, I claim:
1. A power tool comprising:
    a housing;
    a reversible motor having a drive shaft mounted for rotation within said housing;
    a driven shaft supported in said housing and projecting therefrom in coaxial relationship with said shaft and connected to a fastener driving spindle;
    a friction clutch disposed between said drive shaft and said driven shaft for transmitting the rotation of said drive shaft to said driven shaft when said drive shaft is rotated in a first direction and a torque below a predetermined minimum is applied to said driving spindle;
    a planetary gear train rotatively interconnecting said drive and driven shafts;
    an overrunning brake cooperating with said planetary gear train and operative upon rotation of said drive shaft in a second direction;
    said planetary gear train adapted to transmit the rotation of said drive shaft to said driven shaft and cause said driven shaft to rotate in said first direction at a speed less than the speed of said drive shaft.

2. The power tool of claim 1 further including means for biasing said driven shaft toward said drive shaft and against said friction clutch.

3. The power tool of claim 2 wherein said planetary gear train includes a ring gear carried by said driven shaft, a sun gear carried by said drive shaft, a planet carrier having at least one gear freely rotatable thereon mounted on said drive shaft, said planet gear adapted to mesh with said sun and ring gears, said overrunning brake mounted between said housing and said planet carrier and operative to allow said ring gear to rotate relative to said drive shaft in a direction opposite to said drive shaft and prevent said planet carrier from rotating in a clockwise direction when said drive shaft is rotated in said second direction.

4. The power tool of claim 3 wherein said overrunning brake is of the sprag type.

References Cited by the Examiner
UNITED STATES PATENTS

| | | | |
|---|---|---|---|
| 1,082,028 | 12/1913 | Jones et al. | 74—810 |
| 1,255,369 | 2/1918 | Weydell | 74—810 X |
| 1,287,575 | 12/1918 | Delano | 74—810 X |
| 1,441,418 | 1/1923 | Halbleib | 74—810 |
| 2,027,592 | 1/1936 | Hoffman et al. | 74—413 |
| 2,451,767 | 10/1948 | Nardone | 74—810 X |
| 2,467,627 | 4/1949 | Olson | 74—812 X |
| 2,553,202 | 5/1951 | Metsger | 74—810 |
| 2,562,568 | 7/1951 | Nardone | 74—810 |
| 2,588,187 | 3/1952 | Weiser | 74—812 X |
| 2,600,762 | 6/1952 | Hartz | 74—810 |

DAVID J. WILLIAMOWSKY, *Primary Examiner.*

J. R. BENEFIEL, *Assistant Examiner.*